United States Patent [19]

Kaye

[11] 4,444,469

[45] Apr. 24, 1984

[54] NARROW BAND REJECTION FILTER UTILIZING A LIQUID CRYSTAL CELL

[75] Inventor: Wilbur I. Kaye, Corona Del Mar, Calif.

[73] Assignee: Beckman Instruments, Inc., Fullerton, Calif.

[21] Appl. No.: 269,140

[22] Filed: Jun. 1, 1981

Related U.S. Application Data

[63] Continuation of Ser. No. 45,719, Jun. 5, 1979, abandoned.

[51] Int. Cl.³ .............................................. G02F 1/137
[52] U.S. Cl. .................................................. 350/347 E
[58] Field of Search ................... 350/347 E, 352, 332, 350/340

[56] References Cited

U.S. PATENT DOCUMENTS

| | | | |
|---|---|---|---|
| 3,679,290 | 7/1972 | Adams et al. | 350/352 |
| 3,694,053 | 9/1972 | Kahn | 350/347 E |
| 3,711,181 | 1/1973 | Adams et al. | 350/352 |
| 3,784,280 | 1/1974 | Bigelow | 350/347 E |
| 3,785,721 | 1/1974 | Harsch | 350/347 E |
| 4,272,195 | 6/1981 | Kaye | 350/347 E |

OTHER PUBLICATIONS

Scheffer, "Liquid Crystal Color Displays", *Nonemissive Electrooptic Displays* 1975.
Armitage, D. "Liquid Crystal Voltage Controlled Retardation Display", vol. 19, No. 13, Jul. 1, 1980.

*Primary Examiner*—John K. Corbin
*Assistant Examiner*—David Lewis
*Attorney, Agent, or Firm*—R. J. Steinmeyer; R. R. Meads; J. R. Shewmaker

[57] ABSTRACT

There is disclosed a method and apparatus for implementing a narrow band rejection filter utilizing a liquid crystal cell. A liquid crystal cell is positioned in the path of a light beam between a pair of crossed or parallel polarizers with the optical axis of the cell at a 45° angle to the optical axes of the polarizers. A voltage is applied to the cell to tune the cell to reject a given wavelength and to pass other wavelengths. In order to reject the given wavelength and pass all other wavelengths, the order of the cell is stepped to maintain rejection of a fixed wavelength and the detected signal from the light passing through the cell is averaged.

10 Claims, 9 Drawing Figures

NARROW BAND REJECTION FILTER UTILIZING A LIQUID CRYSTAL CELL

This is a continuation of application Ser. No. 045,719, filed June 5, 1979, now abandoned.

BACKGROUND OF THE INVENTION

1. Field of the Invention

The present invention relates to a narrow band rejection filter utilizing a liquid crystal cell and, more particularly, to a simple, inexpensive, and rapid technique for constructing a narrow band light rejection filter.

2. Description of the Prior Art

There are a variety of circumstances in optical instrumentation where one would like a narrow band rejection filter which will reject a single wavelength of light and pass either selected others or all others. For example, in fluorescence measurements, if a sample is excited by light of wavelength $\lambda_1$, a fluorescing sample will emit light having a wavelength $\lambda_2$. Since the wavelength of fluorescence is typically larger than the wavelength of excitation, it is common to use a low pass filter between the incoming light beam and the sample and a high pass filter between the sample and the detector. In order for the measurements to be accurate, there should be no overlap between the pass bands of the filters, but this is virtually impossible using conventional filter elements.

Raleigh scattering spectroscopy and Raman scattering spectroscopy present similar problems. In both, a sample is excited at a first wavelength and light is scattered at different wavelengths. In both types of spectroscopy, sharp separation filters are required. However, simple filters simply do not function in an adequate manner.

SUMMARY OF THE INVENTION

According to the present invention, there is disclosed a method and apparatus for forming a narrow band rejection filter which will reject a single, variable wavelength and pass a selected other variable wavelength. Alternatively, the present filter can be used to reject one wavelength and pass all other wavelengths. Furthermore, the present filter permits the wavelength of rejection to be rapidly and inexpensively varied. As a result, the present filter is ideally suited for use in optical instrumentation such as fluorescence, Raleigh scattering, and Raman scattering spectroscopy.

According to the present invention, a narrow band rejection filter is constructed using a zero-twist liquid crystal cell functioning as a low cost retarder. The retardation of a liquid crystal cell can be varied rapidly and with the expenditure of negligible power simply by changing the voltage applied thereto. This feature, as well as the variable retardation characteristics of a liquid crystal cell, permit a cell to be tuned to reject a given wavelength while passing selected other wavelengths. Furthermore, if one desires to design a filter that rejects one wavelength while at least partially transmitting all other wavelengths, this may be done by time averaging. That is, the liquid crystal cell is stepped rapidly between two or more orders and the detector responsive to the light averages the response.

More particularly, if a liquid crystal cell is positioned between a pair of crossed or parallel polarizers with its optical axis at a 45° angle to the optical axes of the polarizers and an incoming light beam is passed through the polarizers and the cell, a voltage may be applied to the cell to cause it to reject any given wavelength. Furthermore, the order of the cell can be selected so that the filter will reject one wavelength while passing another. Thus, such a filter can be arranged to reject exciting radiation and transmit fluorescing radiation. A liquid crystal cell permits these wavelengths to be easily varied. Furthermore, by switching the voltage on the cell between several selected voltages, one wavelength may be rejected while all other wavelengths may be at least partially transmitted.

OBJECTS, FEATURES AND ADVANTAGES

It is therefore an object of the present invention to provide a rapid and simple narrow band rejection filter for rejecting one wavelength and transmitting another wavelength, both of which wavelengths are variable. It is a feature of the present invention to achieve this object by utilizing a zero-twist liquid crystal cell as a variable retarder in the path of a beam. One advantage to be derived is that a filter may be constructed which is inexpensive. Another advantage to be derived is that a filter can be constructed in which there is no overlap between the rejected and transmitted light.

It is another object of the present invention to provide a method and apparatus for use in an optical instrument for rejecting one wavelength of light while at least partially transmitting all other wavelengths of light. It is a feature of the present invention to achieve this object by utilizing a zero-twist liquid crystal cell as a variable retarder and stepping the voltage applied thereto between preselected values. One advantage to be derived is that a filter may be constructed with is inexpensive. Another advantage to be derived is that a filter can be constructed in which there is no overlap between the rejected and transmitted light.

Still other objects, features, and attendant advantages of the present invention will become apparent to those skilled in the art from a reading of the following detailed description of the preferred embodiment constructed in accordance therewith taken in conjunction with the accompanying drawings wherein:

DESCRIPTION OF THE PREFERRED EMBODIMENT

Figure 1:
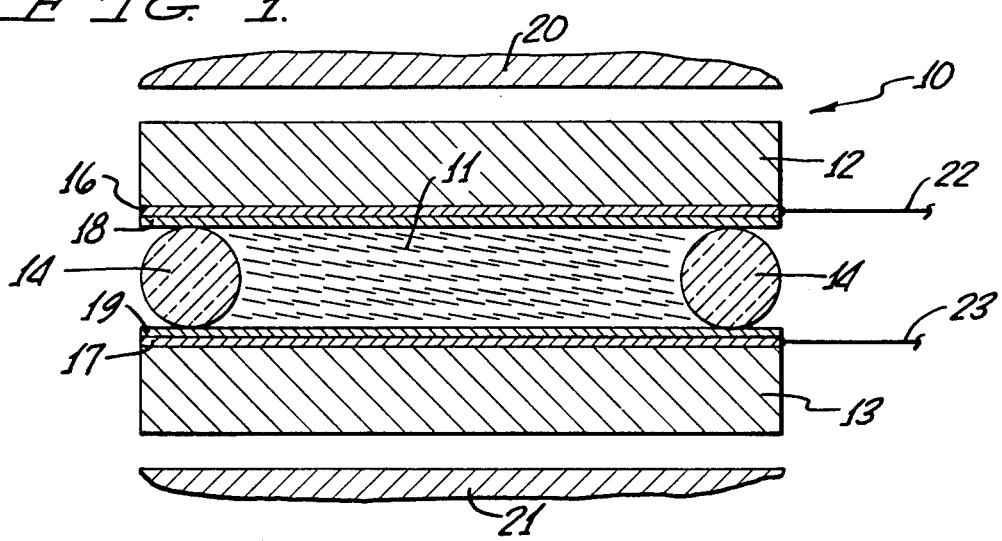
FIG. 1 is a schematic cross-sectional view of a liquid crystal cell for use in the present invention.

It is the teaching of the present invention to utilize a nematic-phase, zero-twist, liquid crystal cell as a variable retarder in a method and apparatus for rejecting a single wavelength of light while passing another selected wavelength of light or all other wavelengths of light. However, before describing the application of a liquid crystal cell to such a method and apparatus, it becomes necessary to understand the applicable properties of birefringent cells in general and liquid crystal cells in particular and the considerations involved in making a cell suitable for use in an optical instrument.

Birefringent cells in general have the property that their refractive index, hence the velocity of propagation of light therethrough, varies with direction through the cell. Such materials are said to be anisotropic. When a polarized light beam passes through a birefringent cell, the beam breaks into two orthogonally polarized components, called the ordinary and extraordinary rays, which propagate with velocities which are inversely proportional to the two refractive indices existing in the directions of beam propagation. These two beams emerge from the birefringent cell with a difference in phase angles. The resultant beam, in general, is said to be elliptically polarized.

When the elliptically-polarized light beam passes through a polarizer, only those components of the beam with their electric vectors in the plane of polarization of the polarizer pass therethrough. The two component beams then interfere and the intensity of the resultant beam is a function of the relative phase angles of the component beams. The greater the product of birefringence and optical path through the birefringent material, the greater the phase angle shift.

If the slow ray emerges with its phase angle 90° behind the fast ray, the two beams totally interfere and the intensity of the beam falls to zero. If the slow ray emerges with its phase angle 180° or some multiple of 180° behind the fast ray, the two rays interfere constructively and there is no diminution of beam intensity.

Assuming that the optic axis of a birefringent cell has been oriented 45° from the parallel planes of polarization of polarizers on opposite sides thereof, the phase angle difference between the component beams is a function of the difference in refractive indices in the orthogonally propagating beam directions, the birefringence, $\Delta n$, the thickness, $d$, of the birefringent material, and the wavelength, $\lambda$, of light. Thus, the relative phase angle is:

$$a = 2\pi d \Delta n / \lambda \qquad (1)$$

The transmittance T of the light passing through the second polarizer, neglecting any absorption losses, is given by the equation:

$$T = 1 - \sin^2(\pi \Delta n d / \lambda). \qquad (2)$$

The product $\Delta n d$ is called the retardation. When the retardation equals $M\lambda$, where M is an integer, the intensity equals unity and the retardation is of the order M. When the retardation equals $N\lambda/2$, where N is an odd integer, the ordinary and extraordinary rays destructively interfere, the intensity falls to zero, and the retardation is said to be of the half order.

A liquid crystal cell is an example of a birefringent element, but it also has a variable birefringence. A cross-section of a liquid crystal cell is shown in FIG. 1. Specifically, FIG. 1 shows a liquid crystal cell 10 consisting of a thin layer of liquid crystal material 11 sandwiched between first and second transparent plates 12 and 13, which are preferably made from glass. The spacing between plates 12 and 13 and, therefore, the thickness d of the liquid crystal layer is determined by suitable spacers 14. The inside surfaces of plates 12 and 13 are coated with transparent conducting layers 16 and 17, respectively, and transparent alignment layers 18 and 19, respectively. Conducting layers 16 and 17 are connected to electrical leads 22 and 23, respectively.

For use in the present invention, liquid crystal material 11 is of the nematic-phase type with a positive dielectric anisotropy. A variety of suitable materials are known to those skilled in the art. A mixture of trans cyano, alkyl biphenyl homologues is one of the most widely used materials for liquid crystal displays. Another available material is a pure trans cyano, propyl phenyl cyclohexane. Another available material is a eutectic mixture of propyl, pentyl, and heptyl cyano phenyl cyclohexane in the mole ratio 2.1 to 1.6 to 1.

For use in the present invention, plates 12 and 13 should have high transmittance, low strain and maximum flatness. The sides of plates 12 and 13 are typically polished to ¼ fringe. Conductors 16 and 17 are typically tin-doped $In_2O_3$ layers. The technique for the deposition of such a layer onto plates 12 and 13 is well known to those skilled in the art.

In a liquid crystal cell, it is necessary to align the liquid crystal molecules such that the long axes of the molecules are parallel to each other and approximately parallel to the surfaces of plates 12 and 13. This can be achieved by rubbing the inside surfaces of plates 12 and 13, as is known in the art. Alternately, alignment layers 18 and 19 on the inside surfaces of plates 12 and 13, respectively, may be used. In this later case, the liquid crystal molecules are typically aligned with layers of SiO deposited on the surfaces of plates 12 and 13.

When using a liquid crystal cell as a variable retarder in an optical instrument, such cell is sandwiched between a pair of polarizers 20 and 21. In such case, the polarization planes of polarizers 20 and 21 are parallel or crossed and oriented at a 45° angle to the optic axis of cell 10.

In the absence of a field applied between conductors 16 and 17, the liquid crystal molecules assume an orientation dictated by alignment layers 18 and 19. That is, the angle between the director, or optic axis, and the plane of conductors 16 and 17 in the absence of a field is called the surface director tilt and is a function of alignment layers 18 and 19. The two alignment layers most commonly encountered in liquid crystal displays are the so-called H and L coats formed by depositing SiO on plates 12 and 13 at incidence angles of approximately 60° and 83°, respectively. It has been ascertained that the surface director tilt with an H coat is 0° and with an L coat is 25°. Other alignment layers known to those skilled in the art produce intermediate surface director tilts.

When a field is applied to cell 10, by applying a voltage between conducting layers 16 and 17, the field exerts a torque on the liquid crystal molecules therebetween and this torque is a function of the field strength, the dielectric anisotropy of the liquid crystal molecules, and the tilt of the liquid crystal molecules. Since the wall forces are stronger than the field forces, those molecules adjacent to plates 12 and 13 are relatively uninfluenced by the field. The elastic forces of the liquid crystal structure then distribute tilt within the cell and those molecules at the center of the cell are usually tilted most.

For a fuller discussion of liquid crystal cells and their application to optical instruments, reference should be had to my copending patent application Ser. No. 045,725, filed June 5, 1979 and entitled Liquid Crystal Tuned Birefringent Filter.

As a voltage is applied to cell 10, via leads 22 and 23 and electrodes 16 and 17, the liquid crystal molecules are rotated, changing the birefringence $\Delta n$ and varying retardation. The effect of applying a voltage to cell 10 can be better understood with reference to FIGS. 2(a)–2(d) which show a series of computer-generated curves 31, 32, 33 and 34, respectively, of transmittance versus wavelength derived from equation (2) for four different values of M. The value of d has been chosen such that the transmittance is zero at a given wavelength $\lambda_1$ for all values of M.

Considering first curve 31, $M=\frac{1}{2}$ at $\lambda_1$. The breadth of this minimum is such that it does not efficiently transmit any of the rest of the region shown; hence it is not likely to be useful. Curve 32, on the other hand, where $M=3/2$ at $\lambda_1$, exhibits a transmittance greater than 50% over an interval from $\lambda_2$ to $\lambda_3$. If one were interested in radiation at a wavelength closer to the rejection wavelength $\lambda_1$, curve 33 for $M=9/2$ has a transmittance greater than 50% over an interval from $\lambda_4$ to $\lambda_5$. Finally, curve 34 for $M=25/2$ is useful within a still closer interval since it has a transmittance greater than 50% over the interval from $\lambda_6$ to $\lambda_7$. Theoretically then, one can obtain good transmission at almost any arbitrary interval close to the rejection wavelength by the proper choice of retardation order. Of course, it is presumed that the beam to be rejected is monochromatic.

In practice, it is possible to obtain a ratio of transmittance at the wavelength of maximum transmittance to that at the rejection wavelength of $10^5$ with a single retardation element, if the beam is collimated. This ratio decreases with uncollimated light, but elements can be stacked to obtain a higher ratio. Ways of minimizing collimation effects are discussed in my copending application Ser. No. 045,726 filed June 5, 1979, and entitled Apparatus For Minimizing Beam Collimation Sensitivity In Optical Instruments Including Liquid Crystal Cells.

Figure 3:
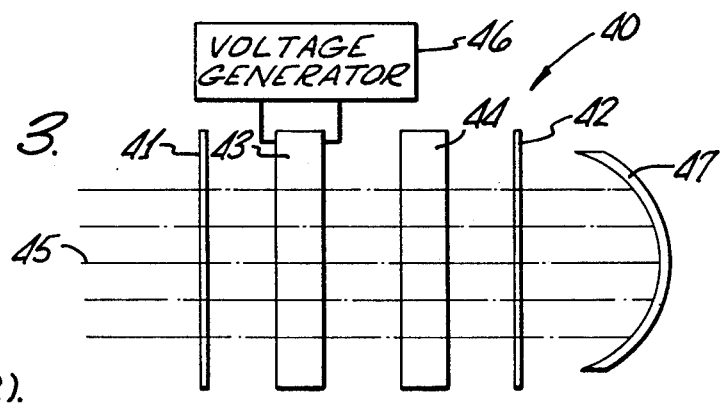
FIG. 3 is a diagrammatic view of a narrow band rejection filter constructed in accordance with the teachings of the present invention.
Figure 2A:
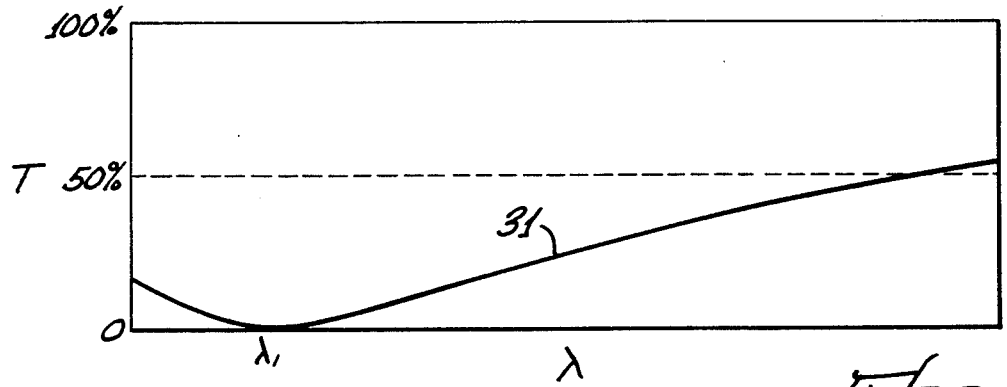
FIGS. 2(a)-2(d) are a series of waveforms showing the manner in which the retardation spectrum of a liquid crystal cell varies as the voltage applied thereto is varied.
Figure 2B:
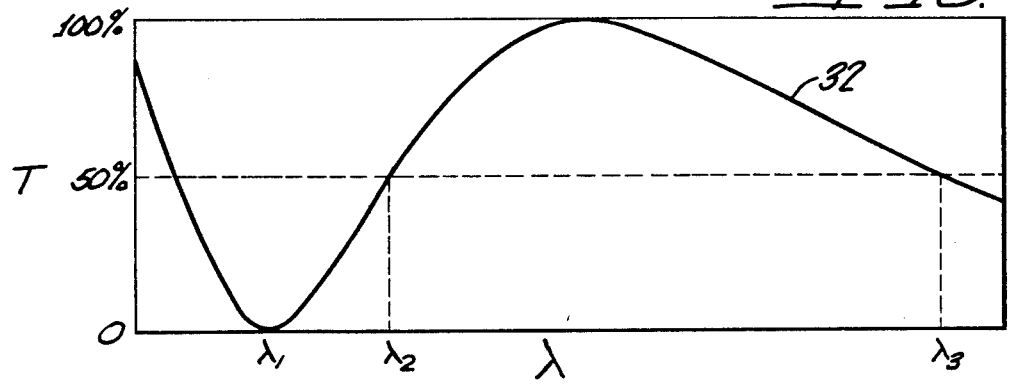
Figure 2C:
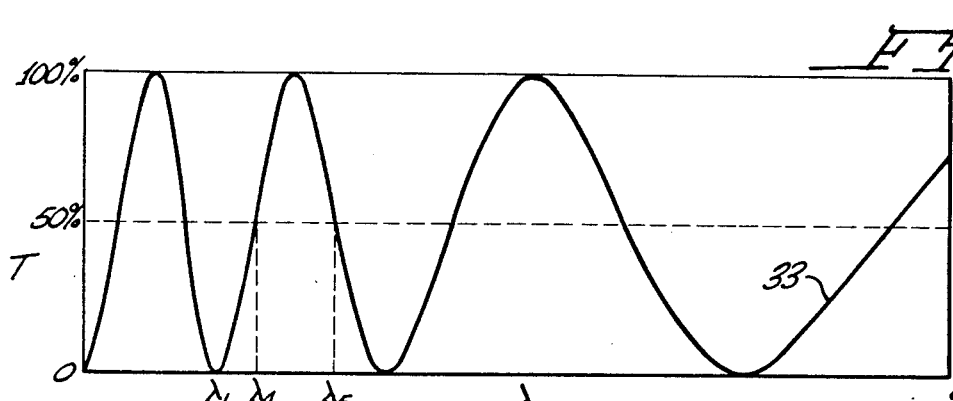
Figure 2D:
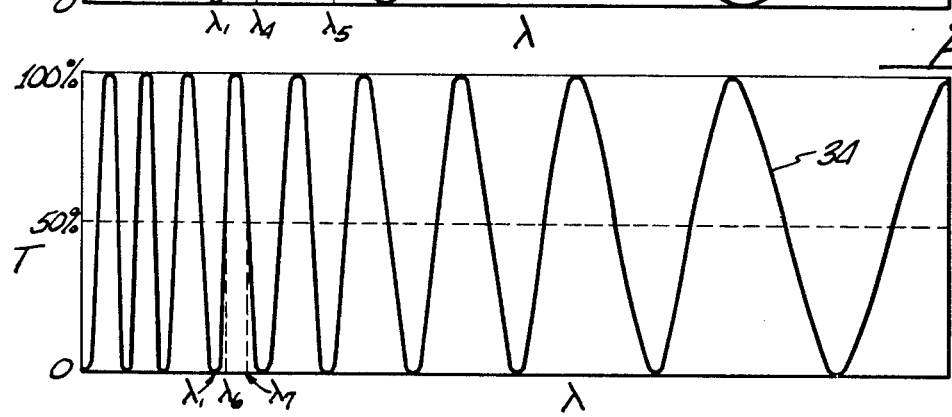

Referring now to FIG. 3, there is shown apparatus, generally designated 40, for use as a rejection filter. Filter 40 consists of two parallel polarizers 41 and 42 whose planes of polarization are either parallel or perpendicular (crossed). Positioned between polarizers 41 and 42 are two retarder elements, a liquid crystal retarder 43 and a fixed retarder 44. Fixed retarder 44 is positioned with its optic axis normal to a beam 45 passing through filter 40 at an angle of 45° to the plane of polarization of polarizers 41 and 42. Retarder 43 is a zero-twist liquid crystal cell whose average optic axis is also confined to a plane at 45° to the plane of polarization of polarizers 41 and 42. However, in liquid crystal cell 43, the molecules can rotate within this plane, depending upon the voltage applied to cell 43 by a voltage generator 46. Thus, the retardation introduced by cell 43 varies with the voltage applied thereto. The manner in which this retardation changes is shown in FIGS. 2(a)–2(d) for a case with only cell 43 positioned between polarizers 41 and 42.

The function of fixed retarder 44 is to increase the total retardation without requiring an excessively thick liquid crystal cell. Retarder 44 can be fabricated of many different birefringent materials. Typically, crystalline quartz is used. By rotating retarder 44 by an angle of 90° about an axis parallel to beam 45 the retardations of retarders 43 and 44 can be made to add or subtract.

It is not possible to reject a particular wavelength while simultaneously and continuously varying the wavelength of an adjacent transmittance maximum. It is necessary to step the order M of cell 43 in order to maintain rejection of a fixed wavelength. With a liquid crystal cell, this step in retardation can be made rapidly and inexpensively by simply changing the voltage applied to cell 43 by generator 46. There are so many usable retardation orders that one can find a combination giving at least 90% transmittance at a single given wavelength while keeping a near zero transmittance at a fixed rejection wavelength.

There are several ways in which filter 40 can be used. The simplest involves fixing the retardation to reject one wavelength, such as the exciting radiation in a spectroscopic application, and to transmit another wavelength, such as fluorescing radiation. Liquid crystal cell 43 is very useful in such an application if the wavelength of exciting radiation is varied since the simple step of changing the voltage applied thereto by generator 46 permits shifting the retardation spectra shown in FIGS. 2(a)–2(d).

In either case, some of the fluorescing radiation is transmitted and some isn't. Over one cycle of retardation order, the integrated transmittance will be 50%. A simple sharp cutoff glass absorption filter can perform the same operation (one fixed exciting wavelength) for less money. However, such a sharp cutoff filter will not transmit wavelengths shorter than the exciting radiation. Further, filter 40 can have a much sharper cutoff than a glass absorption filter, i.e., pass radiation at wavelengths closer to that of the exciting wavelength, and can switch from transmitting to rejecting modes without any mechanical motion.

If one desires to design a filter that rejects one wavelength while at least partially transmitting all other wavelengths, this is possible using filter 40 by use of time averaging. In this mode, filter 40 is stepped rapidly between two or more orders and a detector 47 positioned to detect the light passing through filter 40 averages the response. The signal from detector 47 must be electrically rejected during the short interval during which liquid crystal cell 43 is switching orders.

Figure 4A:
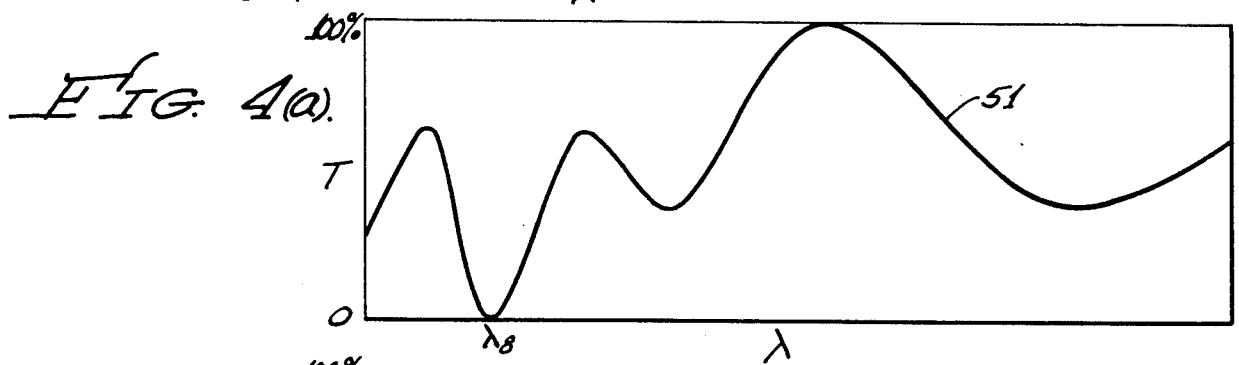
FIGS. 4(a)-4(c) are a series of waveforms showing the time averaged transmittance spectrum of different embodiments of the filter of FIG. 3.
Figure 4B:
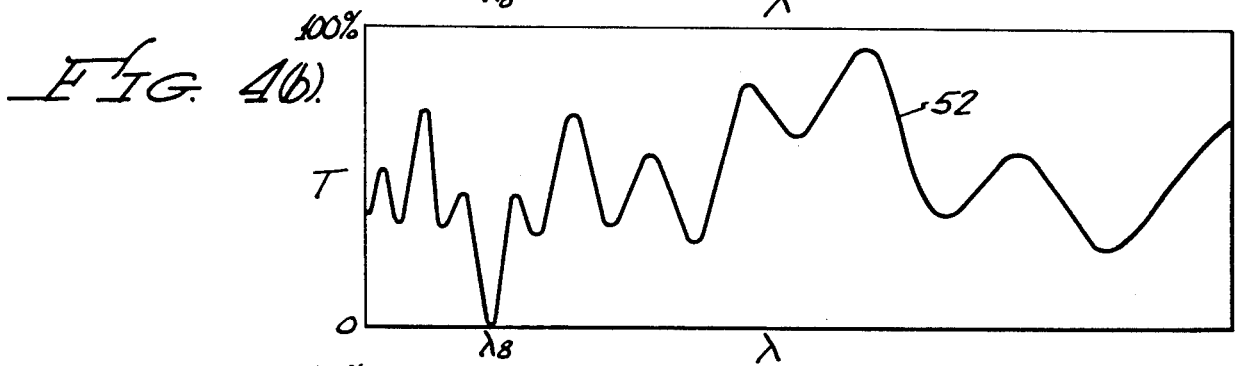
Figure 4C:
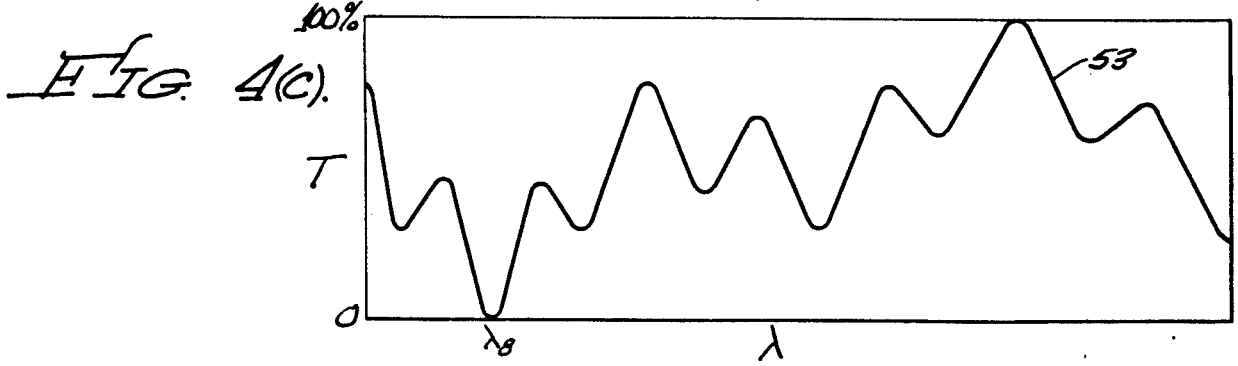

FIGS. 4(a)–4(c) show three such time averaged transmittance spectra. Specifically, waveform 51 of FIG. 4(a) shows the time averaged transmittance spectrum of filter 40 with cell 43 set for a retardation order of 3/2 50% of the time and for 9/2 the remainder of the time. The switching of orders could be accomplished within 1/10th second. It is seen that the averaged transmittance exceeds 35% at all wavelengths more than 17 nm away from the rejection wavelength $\lambda_8$. Waveform 52 shows the time averaged transmittance spectrum of filter 40 with liquid crystal cell 43 switched among three orders, $M=3/2$, 9/2, and 25/2. In this case, transmittance exceeds 28% at all wavelengths more than 7 nm away from rejection wavelength $\lambda_8$.

Finally, FIG. 4(c) shows the time averaged transmittance spectrum 53 of an even sharper rejection filter 40, wherein cell 43 is switched among the orders $M=9/2$, 25/2, and 75/2. Here it is seen that transmittance exceeds 28% for all wavelengths more than 2.5 nm away from the rejection wavelength $\lambda_8$.

It can therefore be seen that according to the present invention, there is disclosed a method and apparatus for forming a narrow band rejection filter which, in one embodiment, will reject a single variable wavelength and pass a selected other variable wavelength. Alternatively, the present filter can be used to reject one wavelength and pass all over wavelengths. Furthermore, filter 40 permits the wavelength of rejection to be rapidly and inexpensively varied by the mere changing of the voltage applied by generator 46 to cell 43. As a result, filter 40 is ideally suited for use in optical instrumentation such as fluorescence, Raleigh scattering and Raman scattering spectroscopy.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A filter for a light beam comprising:
    a liquid crystal cell positioned in the path of said beam and including:
        a pair of parallel, transparent plates;
        a liquid crystal material between said plates; and
        conductor means on the inside surfaces of said plates;
    a pair of crossed or parallel polarizers, said cell being positioned between said polarizers with its optic axis at a 45° angle to the planes of polarization of said polarizers; and
    means for applying a voltage to said conductor means to tune said cell to reject a selected wavelength of light at a particular order of said cell and for stepping the voltage applied to said conductor means to change the order of said cell while rejecting said selected wavelength.

2. A filter according to claim 1, wherein said voltage is variable to change said selected wavelength of light.

3. A filter according to claim 1 or 2, wherein said liquid crystal material is a zero-twist, nematic-phase material.

4. A method for rejecting light of a given wavelength while at least partially transmitting light of all other wavelengths comprising the steps of:
    selecting a wavelength to be rejected;
    positioning a liquid crystal cell between a pair of crossed or parallel polarizers in the path of a beam with said cell being positioned with its optic axis at a 45° angle to the planes of polarization of said polarizers, said cell including a pair of parallel, transparent plates, a liquid crystal material between said plates, and conductor means on the inside surfaces of said plates;
    applying a voltage to said conductor means to tune said cell to reject said selected wavelength at a particular order of said cell; and
    stepping the voltage applied to said conductor means to change the order of said cell while rejecting said selected wavelength.

5. A method according to claim 4, further comprising the steps of:
    detecting the light from said beam passing through said cell and said polarizers; and
    averaging said detected light.

6. A method according to claim 5, further comprising the step of:
    rejecting said detected light during the stepping of said voltage applied to said conductor means.

7. A method according to claim 4, further comprising the step of:
    varying said voltage to change said selected wavelength.

8. A method according to claim 4, 5, 6, or 7, wherein said liquid crystal material is a zero-twist, nematic-phase material.

9. An optical instrument comprising:
    a tunable optical filter, comprising a liquid crystal cell including means for receiving a voltage for tuning the filter, the filter being characterized by a filter transmission spectrum having, at any one value of the tuning voltage, minima at a longest wavelength and a plurality of shorter wavelengths, the consecutive minima being identified by consecutive numbers beginning with the number "one" for the longest wavelength, and the value of the wavelength at which each minimum occurs being a function of the tuning voltage;
    means for stepping the tuning voltage among each of a plurality of different values, each of which tunes the filter so that a differently numbered transmission spectrum minimum occurs at a selected wavelength; and
    means for measuring the average value of the different amounts of light transmitted through the filter when the tuning voltage has said different values.

10. An optical instrument according to claim 9 further comprising means for illuminating a sample with light of the selected wavelength, wherein the filter is arranged so as to receive light radiated away from the sample in response to the illumination.

* * * * *